G. H. DAY.
SWAGING MACHINE.
APPLICATION FILED JUNE 8, 1911.
1,006,832.
Patented Oct. 24, 1911.
7 SHEETS—SHEET 1.
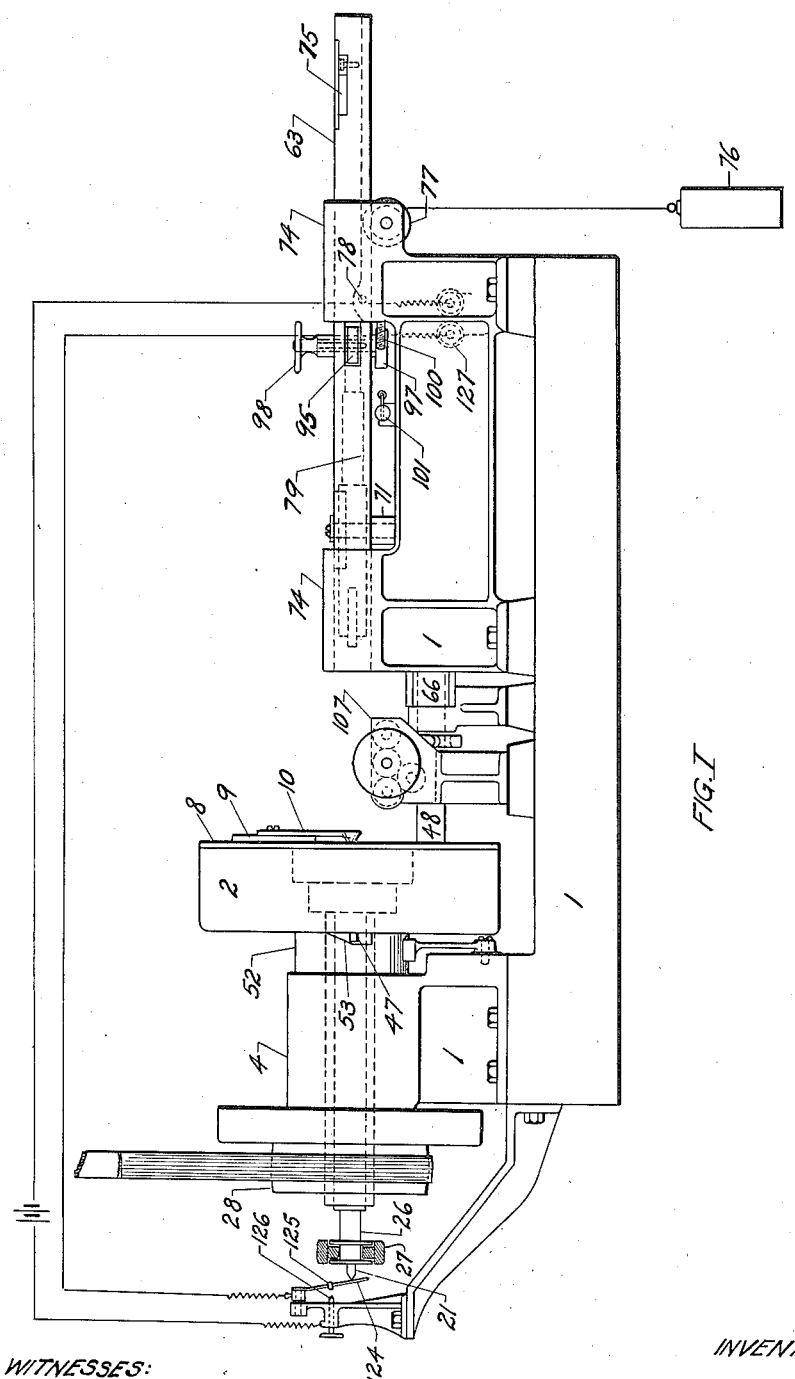
FIG. I
WITNESSES:
Reginald H. Waters
Paul T. Trueman
INVENTOR
GEORGE H. DAY
BY Harry H. Styll
ATTORNEY

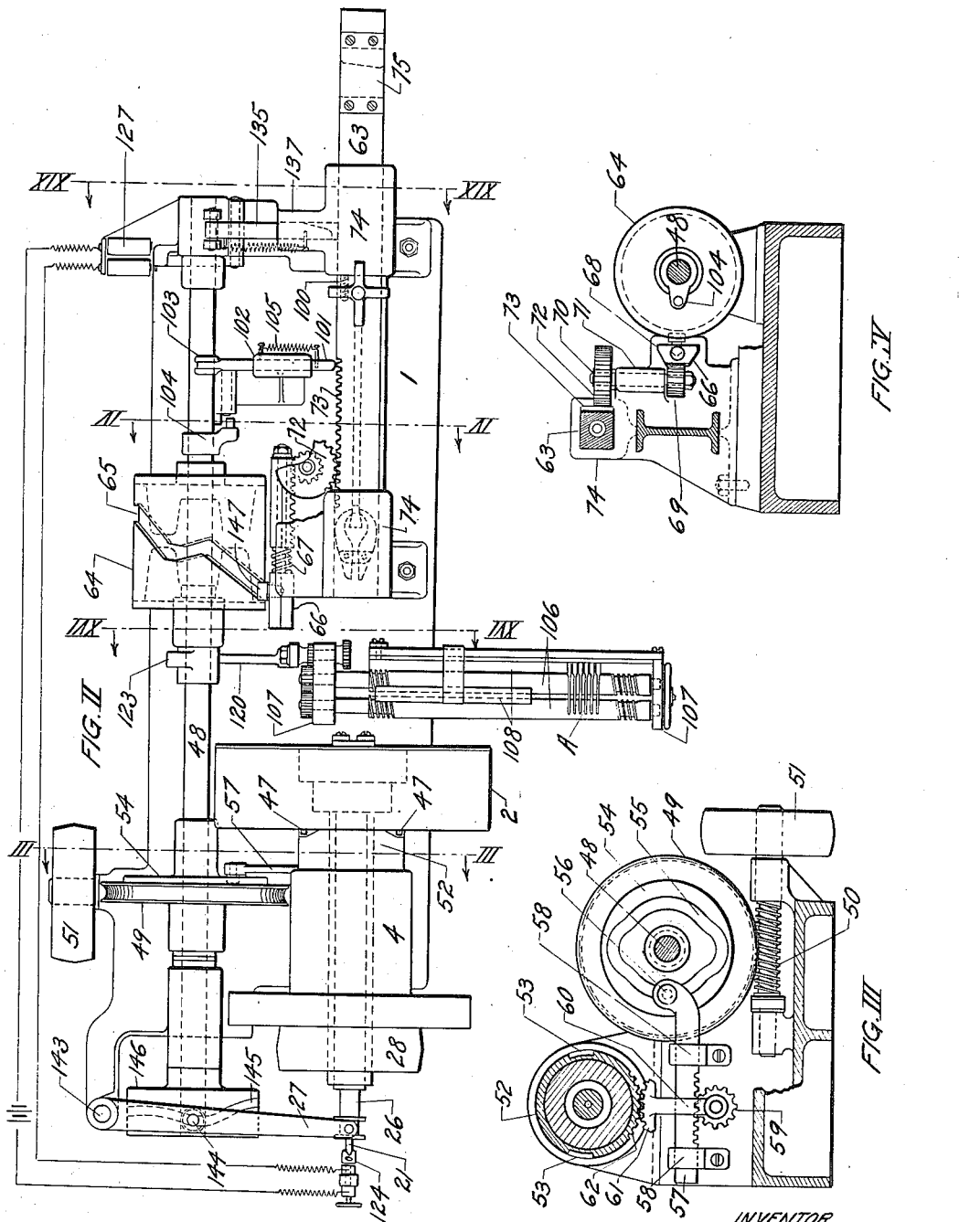

G. H. DAY.
SWAGING MACHINE.
APPLICATION FILED JUNE 8, 1911.
1,006,832.
Patented Oct. 24, 1911.
7 SHEETS—SHEET 3.
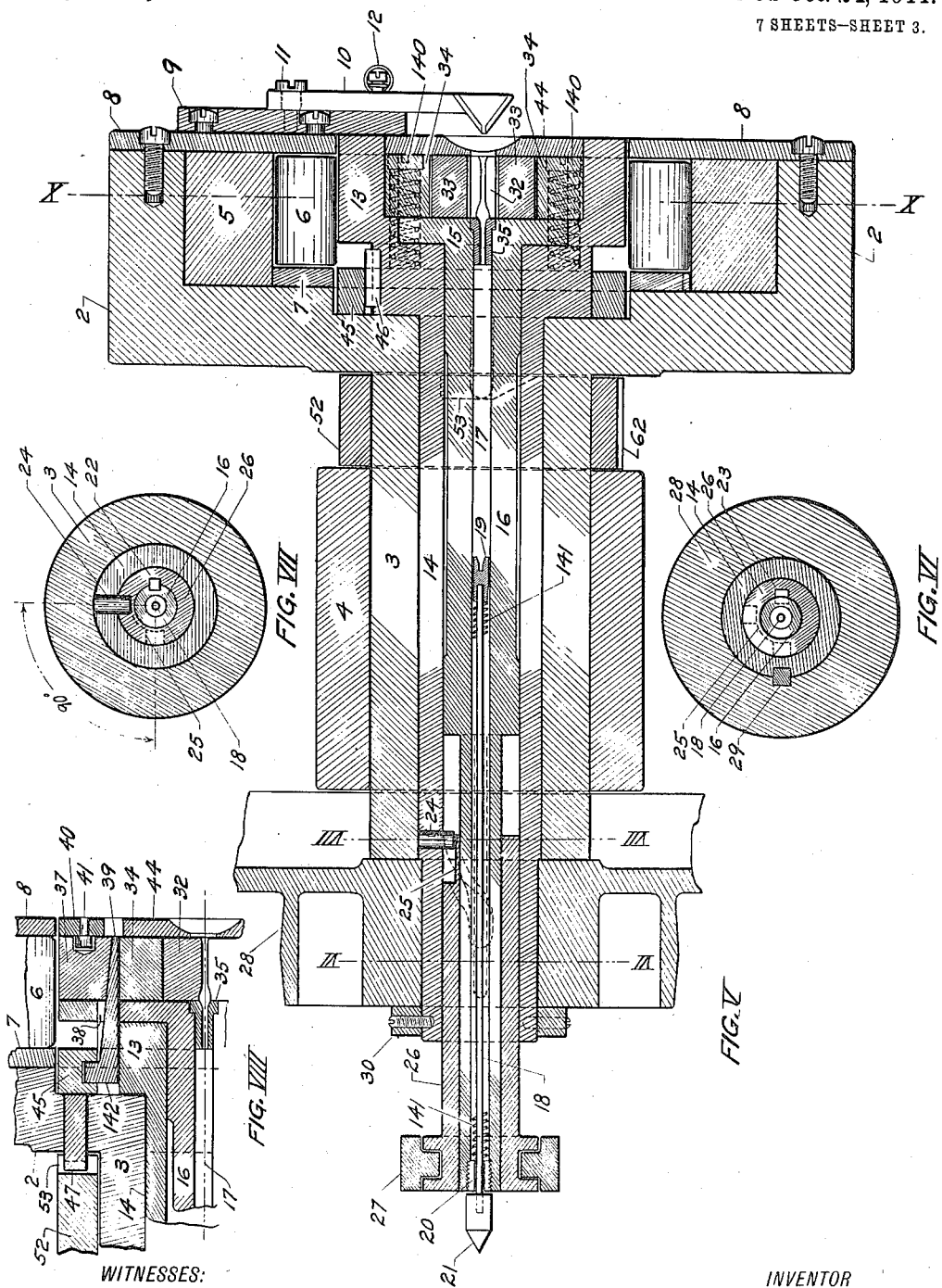
WITNESSES:
Reginald H. Waters
Paul T. Trueman
INVENTOR
GEORGE H. DAY.
BY Harry H. Styll
ATTORNEY G. H. DAY.
SWAGING MACHINE.
APPLICATION FILED JUNE 8, 1911.
1,006,832.
Patented Oct. 24, 1911.
7 SHEETS—SHEET 4.
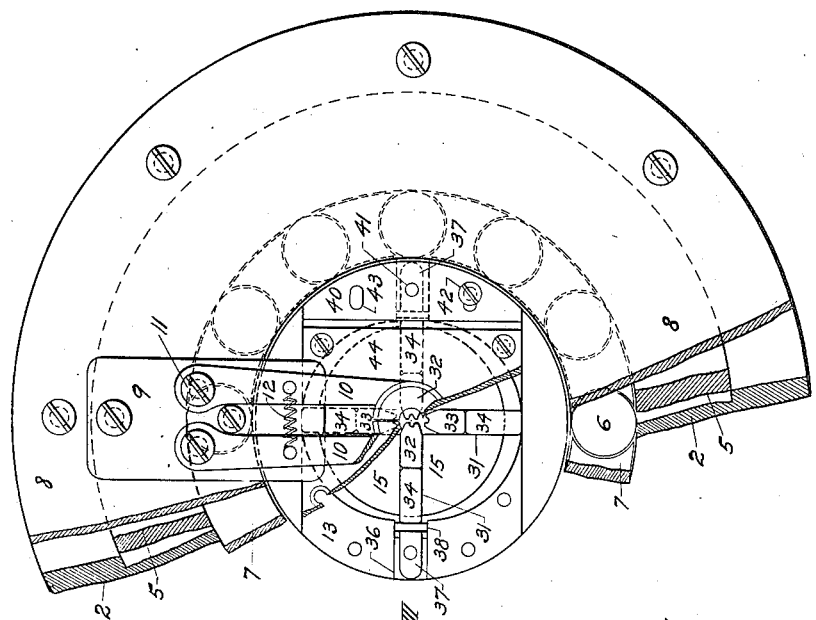
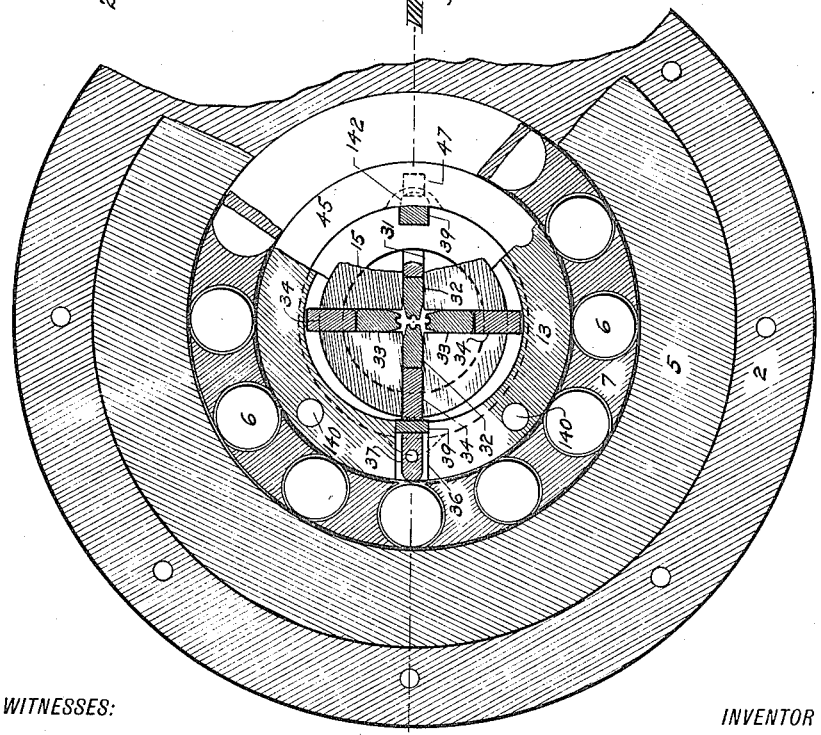
WITNESSES:
Reginald H. Waters
Paul T. Trueman
INVENTOR
GEORGE H. DAY.
BY Harry H. Styll
ATTORNEY G. H. DAY.
SWAGING MACHINE.
APPLICATION FILED JUNE 8, 1911.
1,006,832.
Patented Oct. 24, 1911.
7 SHEETS—SHEET 5.
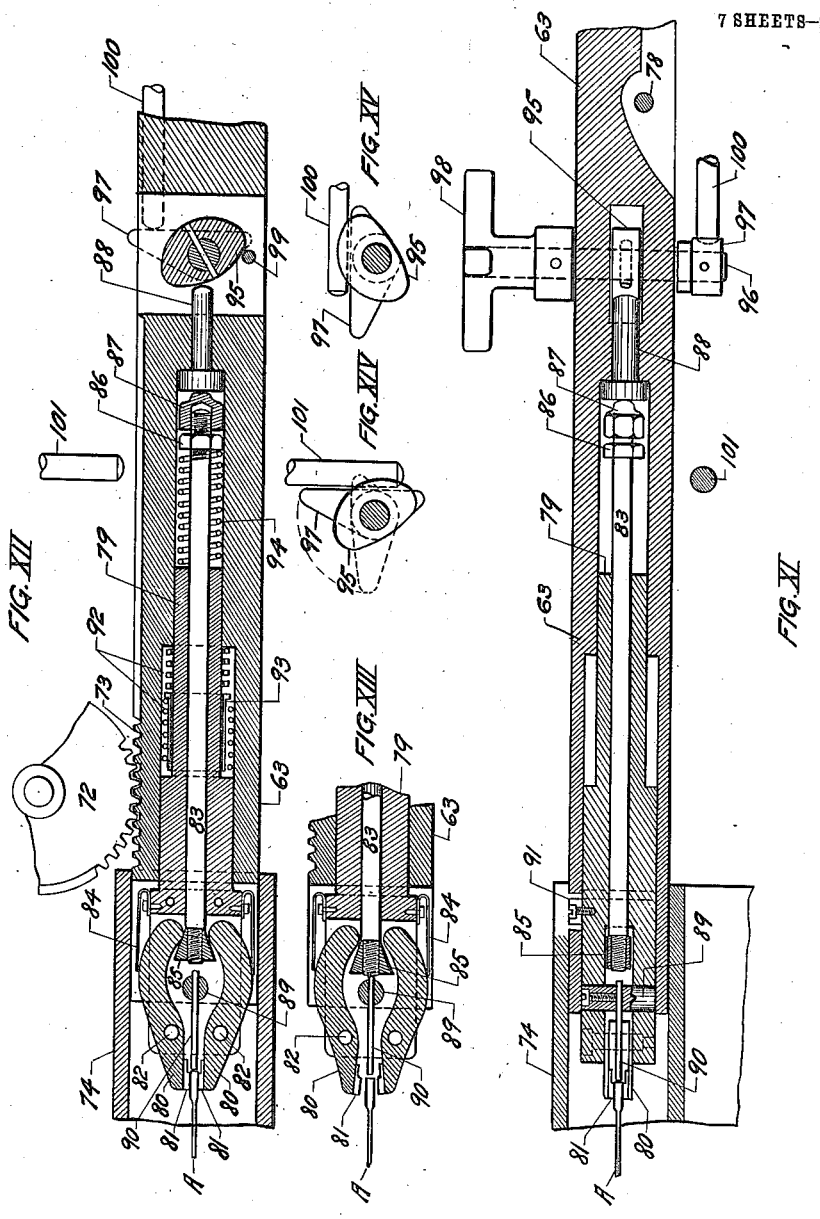
WITNESSES:
Reginald H. Waters.
Paul T. Trueman.
INVENTOR
GEORGE H. DAY
BY Harry H. Styll
ATTORNEY

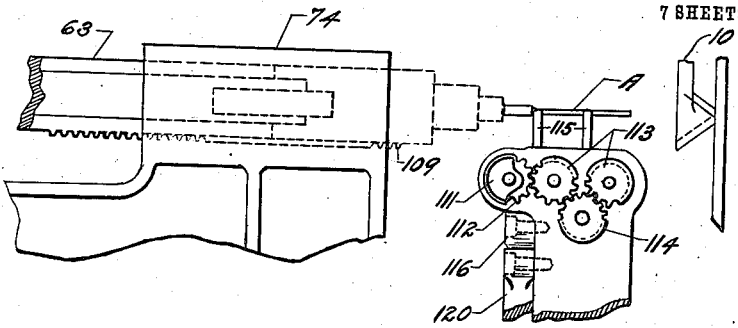
FIG. XVIII
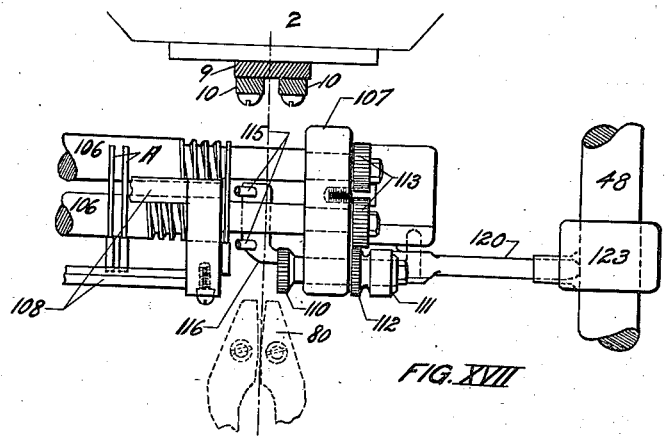
FIG. XVII
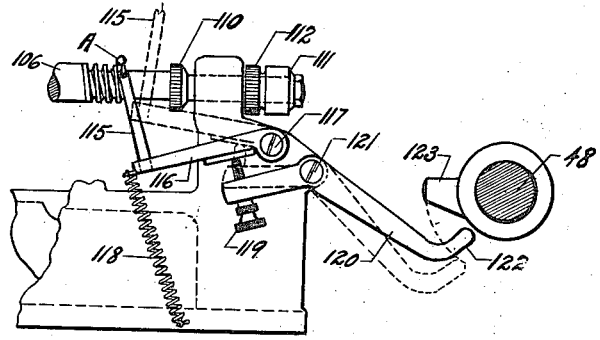
FIG. XVI

G. H. DAY.
SWAGING MACHINE.
APPLICATION FILED JUNE 8, 1911.
1,006,832.
Patented Oct. 24, 1911.
7 SHEETS—SHEET 7.
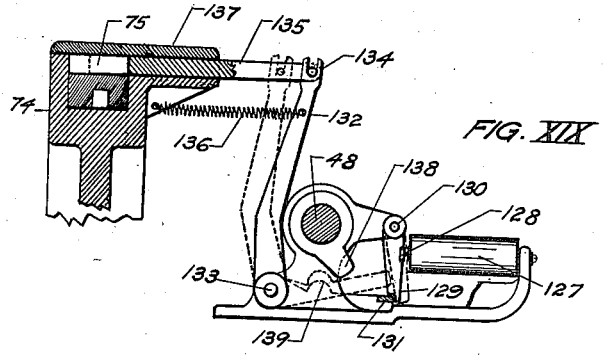
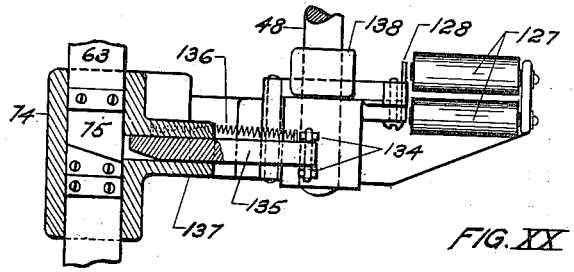
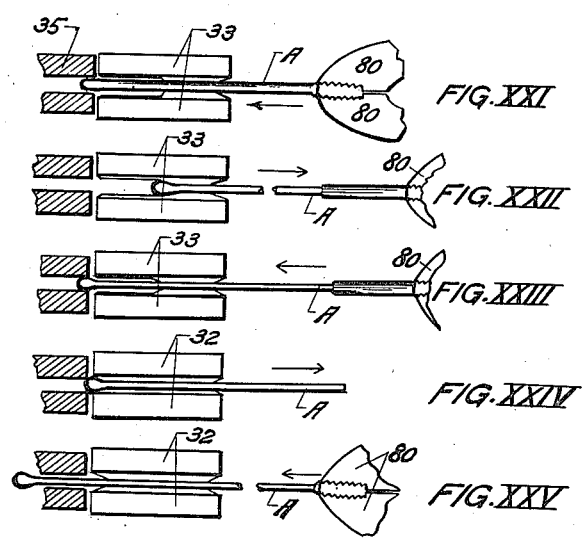
WITNESSES:
Reginald H. Waters.
Paul S. Trueman.
INVENTOR
GEORGE H. DAY.
BY Harry H. Styll
ATTORNEY

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

SWAGING-MACHINE.

1,006,832.   Specification of Letters Patent.   Patented Oct. 24, 1911.

Application filed June 8, 1911. Serial No. 631,977.

*To all whom it may concern:*

Be it known that I, GEORGE H. DAY, a citizen of the United States, residing at Southbridge, in the county of Worcester and State of Massachusetts, have invented certain new and useful Improvements in Swaging-Machines, of which the following is a specification.

This invention relates to a machine particularly adapted for forming temples for spectacles, but capable of other uses where the stock is reduced and expanded.

The principal objects of this invention are to provide means for holding the stock and for conveying it into position to be grasped by the feeding means; to provide means for automatically taking the stock from the conveyer and positioning it to be operated upon by the feeding means; to provide in the said feeding means a means for grasping the stock when automatically positioned and for releasing it when the operation is completed; to provide means whereby the feeding means is caused to bring the stock to be worked upon into contact with the forming tools; to provide means for operating the feeding means whereby it will alternately advance and withdraw the stock while being operated upon by the forming tools; to provide means whereby the feed advance will be stopped when the stock has obtained a predetermined elongation, and held without movement until the withdrawing mechanism becomes operative; to provide means to compensate for movement in the feed advancing mechanism between the time the stock is stopped and the withdrawing mechanism becomes operative; to provide for a type of machine in which the hammering rapidity of the forming tools shall be independent of the speed ratio of the mechanism operating the work feeding means; to provide an advancing feed which will be capable of a certain amount of resiliency in order to compensate for the back flow of the stock of the advancing blank when it is intermittently grasped and stopped by the contact surface of the forming dies; and especially to provide for a plurality of reciprocable forming tools or dies provided with means for causing them to alternately operate on the work being fed thereto without changing the central position of the work.

With these and other objects in view, the invention consists in the novel construction and arrangement of parts hereinafter described, delineated in the drawings and specifically claimed, it being understood that changes properly falling within the scope of what is claimed may be made without departing from the spirit of this invention.

Similar numerals of reference are employed to denote corresponding parts in the accompanying drawings.

Figure I is a longitudinal elevation of the machine viewed from the side on which the feeding slide is located. Fig. II is a general plan view of Fig. I. Fig. III is a section on line III—III of Fig. II looking in direction of the arrows, showing the method of driving the cam shaft, and for oscillating the cam ring controlling the wedges. Fig. IV is a section on line IV—IV of Fig. II looking in direction of the arrows, showing the means for imparting linear motion to the feeding slide. Fig. V is a vertical longitudinal section on an enlarged scale through the center of the head and its elements. Fig. VI is a cross section on line VI—VI Fig. V showing the arrangement of keys and keyways. Fig. VII is a cross section on line VII—VII Fig. V showing the arrangement of keys and spiral slot in the inner spindle. Fig. VIII is a partial transverse section of line VIII—VIII Fig. X showing one of the wedges about to be advanced to throw a set of dies into action. Fig. IX is a front view of the head having the facing members broken away to show arrangement of dies in the slots. Fig. X is a transverse section through the head on line X—X, Fig. V, broken away further to show the internal arrangements. Fig. XI is a longitudinal vertical section through the center of a portion of the feeding slide to show the mechanism of the feeding jaws. Fig. XII is a horizontal section of Fig. XI. Fig. XIII is a sectional view of the feeding jaws in open position. Fig. XIV is a plan view of the operating cams of the feeding jaws in position indicating that the jaws are closed. Fig. XV is a plan view of the cams shown in Fig. XIV but in position indicating that the jaws are open. Fig. XVI is a front view of a portion of the magazine supply and elevating mechanism for supplying blanks to the feeding jaws, taken on line XVI—XVI of Fig. II. Fig. XVII is a plan or top view of Fig. XVI. Fig. XVIII is a side view of Fig. XVII taken from the side nearest the cam shaft. Fig. XIX is a section on line XIX—XIX Fig. II showing an end view of the electrical stop gear. Fig. XX is a view, part plan and part sectional, of Fig. XIX. Figs. XXI to XXV inclusive are diagrammatic views illustrating the various stages of completion of the work as performed by this machine when manufacturing a temple.

Referring specifically to the drawings, the preferred form of the invention will be described.

The invention is shown in the form of a machine embodying a bed plate and frame 1, having mounted thereon a fixed head 2 having an elongated shank 3 fixedly supported in a bearing 4. This head is counterbored, see Figs. V, IX and X, to mount an annular fixed roller ring 5, and a plurality of rollers 6 mounted in and extending inwardly slightly beyond a roller cage 7. These rollers are retained within the counterbore by means of a face plate 8 connected to which is a centering plate 9, on which are mounted work centering arms 10 pivoted on pins 11 and yieldingly held together by means of a tension spring 12. Within the fixed head are a plurality of spindles, the outer of which has an enlarged head 13 and a reduced shank 14. This outer spindle is in turn counterbored to next an inner spindle having an enlarged head 15 and a reduced shank 16, the two spindles being journaled and revoluble within the fixed head. The outer spindle will hereafter be referred to as the wedge spindle and the inner one as the die spindle. The die spindle is also centrally bored at 17 to house a small reciprocating rod 18 terminating at its inner end in an enlargement 19 and passing out of the inner spindle through a centering bearing 20 to terminate in an enlarged head 21 on its outer end. The rod 18 is held within the bore 17 by means of a spiral spring 141 having its fixed bearing against the inner end of the centering bearing 20 and its movable bearing against the rear face of the enlarged end 19.

The wedge and die spindles are made to rotate together by the slidable tubular spool cam 26 which is interposed between the reduced portion of 16 Figs. VI and VII, and the inner circumference of 14, there being a sunken key 22 in the outer circumference of 16 engaging a keyway 23 in the inner circumference of 26 and an inwardly protruding pin 24 from the inner circumference of 14 engaging at all times a spirally cut slot 25 in the outer circumference of 26; this slot being cut through a revolution of 90 degrees. The protruding end of 26 is formed into turned up collars to engage the ends of the oscillating arm 27, Fig. II, which in its oscillation, causes the tubular cam 26 to travel along in the space between the spindles 14 and 16, the contact of the pin in the spiral slot thus setting up a relative revolution of 90 degrees between the spindles at each stroke. One end of the oscillating arm 27 is pivoted on the frame of the machine at 143, Fig. II, and is caused to oscillate by the engagement of the cam pin 144 with the circumferential cam slot 145 cut in the periphery of the cam wheel 146. Revolution of the spindles is produced by pulley 28 non-rotatably held to the wedge spindle by means of key 29, Fig. VI, and backed up by the collar 30 on the protruding end of the wedge spindle 14.

Within the head 15, Figs. IX and X, of the die spindle are cut two diametrically opposed cross slots 31 in which are mounted two sets of dies, consisting of two opposed similar dies to each set. Dies 32 will be called the finishing dies and dies 33 will be called the breaking down dies. Immediately back of each of these dies is mounted a dog 34, both the dogs and dies being radially reciprocable within the slots in the head of the die spindle. Within the head of the central bore 17 Fig. V, is mounted a work centering bushing 35. Across the outer rim of the head of 13, Figs. VIII, IX and X, of the wedge spindle is cut a single slot 36 in which are mounted reciprocable anvils 37, and cut horizontally across the periphery of the intermediate portion of this head are opposed wedge slots, one of which is shown in Fig. VIII, in which wedges 39 protrude forwardly through the rectangular hole 38 in the slotted portion 36 of the wedge spindle head. The anvils 37 are prevented from escape by their attachment to reciprocating plates 40 through pin connection 41, said reciprocating plates being fastened to the head of the wedge spindle by means of screws 42 working in slots 43 in the face of the plates 40, Figs. VIII and IX. Displacement of the dies and dogs in the head of the inner spindle is prevented by the rectangular plate 44 which covers its face and is attached to the face of the wedge spindle, and has a central hole to admit of the entrance of the work to the tools.

Within the counterbore of head 2, Figs. V, VIII and X, and to the rear of the largest section of the wedge spindle is the annular floating wedge ring 45 non-rotatably keyed to an intermediate portion of the head of the wedge spindle 13 by means of the key 46. A portion of the inner circumference of this ring is recessed to receive the flanged head 142 of the wedge 39. Slidably engaging the rear face of ring 45, and diametrically opposed are thrust pins 47 non-rotatably piercing the rear case of head 2, Figs. I and VIII. It will be seen when pins 47 are pressed inwardly, in a manner to be described hereafter, that their inner ends will push forwardly the annular wedge ring 45 thus causing the wedges locked therein to advance through the slot 38 previously described in the head of the wedge shaft. The cam shaft 48 extending the full length of the machine and suitably mounted in bearings on the bed thereof is rotated by the worm wheel 49 which in turn receives motion from the worm 50, Fig. III, on the shaft of the driving pulley 51 which may receive power from any desired source.

Immediately to the rear of the fixed head 2 and rotatably mounted on the stationary shank 3 is the wedge cam ring 52. This wedge cam ring has two diametrically opposed and oppositely cut cam slots 53 into which thrust pins 47 fit and by which they are reciprocated. On the face of the worm wheel 49, Fig. III, is the cam plate 54, in the face of which is cut cam groove 55 and engaging therewith is the cam pin 56 fixedly attached to the end of the reciprocating rack 57 which is mounted in guides 58 and on its under side has a series of rack teeth to engage a pinion 59 journaled to the frame of the machine and having fixedly attached thereto an upwardly extending oscillating gear arm 60 having its head fashioned into a gear segment 61 whose teeth mesh with a series of corresponding teeth 62 cut in the under side of the wedge cam ring 52.

It will be seen that as cam plate 54 revolves the cam pin 56 will be given a linear motion by reason of its engagement with the cam slot 55. This will impart a transverse motion to the reciprocating rack 57 in its guides 58, thus causing a partial revolution of the wedge cam ring 52 through its gear connections with the oscillating rack.

When the wedge cam ring 52 has reached the "off" position, that is, when in such position as to house thrust pins 47 in the deep part of slots 53, the annular floating wedge ring 45 will be caused to recede against the rear of the head by the action of the springs 140 mounted in the holes shown in the head of the wedge spindle 13, Fig. X, and the thrust pins 47 thereby forced into corresponding slots 53 in the cam ring 52, thus partially drawing back the wedges 39 in the slots 38 in the head of the wedge spindle and loosening anvils 37 and dogs 34, see Figs. V and VIII. It will be noted that when the slots of the die spindle holding a set of dies and dogs are brought in line with the cross slot holding the anvils and wedges in the head of the wedge spindle that the wedges 39, Fig. VIII, may be advanced simultaneously in the slots 38 by the wedge cam ring 52. The wedges will protrude between the ends of the dogs 34 and the anvils 37 and force those members apart bringing the outer ends of 37 into contact with the peripheries of the diametrically opposed rollers 6, which will cause a rapid intermittent hammering action set up by the several rollers as they are passed over by the protruding ends of the anvils 37 to be transmitted through the wedges to the set of working dies then in action.

After the proper interval of work by the breaking down dies the wedge cam ring 52 will be oscillated to release the wedges as previously described and the heads of the die and wedge spindles will be given a relative one-quarter turn by the advancement of the tubular cam spool 26, as previously described, thus bringing the other set of dies in the die spindle into line with the slot in the wedge spindle, at which time the wedge cam ring will again oscillate to force in the wedges and perform the same operation as explained above for the first set of dies.

It will be noted that the head of the wedge spindle is counterbored to an elliptical section in way of the head of the die spindle which allows the set of dies and dogs not in line with the wedges to be centrifugally thrown radially away from the center until they bear against the counterbore of the wedge spindle, thus allowing for the advancement of the other set of dies centrally on the work, see Figs. IX and X.

Linear motion is imparted to the feeding slide by the following mechanism: On cam shaft 48, Figs. II and IV, is keyed the cam drum 64, having cut in its circumference a cam slot 65 engaging cam pin 147 which is attached to one section of a divided reciprocating rack 66 which has two sections held together by a central connecting bolt and maintained in tension by a helical spring 67 and is reciprocable in slideway 68 mounted in the frame of the machine. On the inner vertical face of one section of this divided rack is a set of teeth which engage with a pinion 69 mounted on a vertical shaft 70 journaled in a bearing 71 on the frame of the machine. On the upper end of vertical shaft 70 is keyed a pinion 72 which meshes with the rack teeth 73 cut in the side of the feeding slide 63. This feeding slide is reciprocable in its bearing 74 and has near its rear end an adjustable locking slot 75, the use of which will be explained hereafter. To maintain tension on divided rack 66 and to provide for a prompt back run of the feeding slide 63, there is provided a weight 76, Fig. I, supported on a chain running over a sheave 77 worked below the center of the feeding slide 63, the other end being attached to the feeding slide at 78. The center of one end of the feeding slide 63, Figs. XI and XII, is counterbored to house the work holding means; consisting of a feed spindle 79, the protruding end of which is bifurcated to form parallel sections and flattened to house the jaws 80. These jaws have mounted in their work holding ends a suitable set of teeth 81 for grasping the blank A to be worked upon, and are fulcrumed on pins 82, the rear ends being pressed centrally against the spindle 83 by means of springs 84. The spindle 83, which is journaled in a central bore in spindle 79, terminates at one end in a tapered head 85 which protrudes between the ends of the jaws 80, the other end being fitted with a spring tension nut 86 and beyond that a length adjusting nut 87 which bears against the head of a plunger pin 88. Between the jaw members is located a vertical pin 89 connecting the divided ends of 79 and having a transverse hole intermediate of its ends in which is located an adjustable positioning pin 90 which prevents the work to be grasped from entering too far within the teeth of the jaws. To prevent the displacement of the feed spindle there is provided a positive stop 91 rigidly fastened thereto and protruding through an enlarged recess in the slide 63 in a manner permitting of a restricted linear movement of the spindle 79 within the slide 63. To provide for resiliency of feed spindle 79 when the feed slide is advancing the blank A through the dies there is provided a set of double acting springs 92, which are separated from each other by a flanged bushing 93. The tension of these opposed springs is regulated to balance the feed spindle within the counterbore of 63; the movement of the spindle being restricted by the stop 91, as explained. To keep the tapered head 85 of the spindle pressed against the extended arms of the jaws to close those members there is provided a tension spring 94 having its movable bearing against the spring tension nut 86 and its fixed bearing against the end of 79.

The following mechanism is employed in opening and closing the jaws of the feed spindle: It will be noticed, Fig. XIII, that by advancing the spindle 83 and its head 85 forwardly between the extension jaw members that the tension springs 84 will cause a pivoting motion of the jaws 80 about the fulcrums 82, thus closing the extension arms centrally on the spindle 83 and opening the work holding extremity of the jaws. This movement of the spindle 83 is accomplished by means of a locking cam 95 fixedly secured intermediate of the ends of the vertical shaft 96 which runs through the slide 63 and has at its lower end an operating arm 97 fixedly keyed thereto and at its upper end a hand wheel 98. When the locking cam is thrown to the left through an angle of 90 degrees from the position indicated in Fig. XII and its long axis therefore passing the center of plunger 88, pushing it forward and causing an advance of the rod 83 with its head 85, the jaws 80 will be opened to receive the work. When the operating arm 97 is at right angles to the center of the spindle, as shown in Figs. XII and XIV, it will be seen that the operating cam is out of contact with plunger 88, thus permitting the tapered head 85 of rod 83 to be held in tension by spring 94 against the rear portion of the jaw members pinching the teeth together about the jaw fulcrum 82. To prevent the locking cam 95 from an excessive revolution a stop pin 99 has been interposed in the slot in the feeding slide providing for the operation of this member. Fixedly secured in the bed of the machine is an opening stop pin 100, Figs. I and XII, which contacts with the extension of the operating arm as the slide is returning with its jaws closed, thus turning the operating arm through an angle of 90 degrees to a position parallel to the center of the slide and consequently opening the jaws, as shown in Figs. XIII and XV. As the feed spindle is again started forward it will be noticed that the jaws remain in an open position up to a point where closing pin 101, Figs. II and XII, is caused to shoot across transverse to the motion of the feeding slide, and, as shown in Fig. XIV, knock the operating arm back to a position at right angles to the motion of the feed spindle, thus closing the jaws. This jaw closing pin 101 is slidable in its bearing 102 on the bed of the machine, Fig. II, and is operated by means of a bell crank lever 103 engaging the cam 104, which in its revolution with the cam shaft 48, contacts with the lower arm of the lever, thus causing an inward oscillation of its head and a sliding of the closing stop pin 101 in its bearing 102 as explained above. Upon cam 104 passing and releasing the lower end of the bell crank lever, spring 105 will cause the pin 101 to recede from its position and reset the lever.

The magazine feed supply will now be described, with special reference to Figs. II, XVI, XVII and XVIII: This consists of a pair of parallel feeding screws 106 rotatable in their bearings 107 and containing within their threads the blanks or stock A to be worked upon by the machine. These blanks are retained in the threads of the screws by means of the top and side guards 108. The feed screws are caused to rotate in the same direction and advance the blanks A centrally to the position where they are picked up by the elevator mechanism hereinafter described. On the bottom of the feed slide 63 is a series of rack teeth 109, Fig. XVIII, which, when the feed slide is moved forward, will run over and engage the teeth of driving pinion 110, Fig. XVII, connected to a horizontal shaft running transverse of bearing 107 and having secured to its outer end a ratchet case 111, adapted to permit of the return of the rack teeth over pinion 110 without back-running the screws, and integral therewith a transmission pinion 112. This transmission pinion meshes with pinions 113 keyed to the protruding ends of the feeding screws 106 and causes them to rotate in the same direction by the interposition of idler pinion 114. The blanks A are taken from the end of the feed screws 106 and held up in position for the action of the feed jaws in line with the center of the head by means of an elevator mechanism, comprising a pair of arms 115 having their upper ends recessed and their lower ends mounted on the oscillating lever 116 which is pivoted to the frame of the machine at 117 and held in the down position by means of spring 118. Contacting with the under side of lever 116 is an adjustable contact screw 119 on the bell crank lever 120 which in turn is pivoted at 121 to the bed of the machine. The end 122 of lever 120 is caused to contact with the cam 123 rotating with the cam shaft 48 and, as will be seen from Fig. XVI, the rotation of cam 123 will depress the point of the bell crank lever 120, causing an elevation of the lever 116 through its contact 119 with the bell crank lever, causing the recessed ends in the arms 115 to lift a blank from the ends of the feed screws and hold same in position for action of the feed jaws, as shown in dotted lines in Fig. XVI.

The action of the electrical stop gear on feed slide will now be described with special reference to Figs. I, XIX and XX: When the blank A has attained a predetermined length its end, as it advances along the bore 17 of the die spindle, Fig. V, will contact with the enlarged end 19 of the oscillating rod 18 thus causing that member to slide rearwardly in the bore. The head 21 will then press against a spring 124, Fig. I, causing a contact point 125 on said spring to engage an adjustable opposed contact point 126; this action will close an electrical circuit which will then flow through the electro-magnet 127 shown in Figs. XIX and XX. This magnet will attract an armature 128 bedded in the arm of the latch 129, causing this latch to oscillate about its pivot 130 and drawing its lower end away from the foot 131 of the bell crank lever 132 which pivots at 133 on the bed of the machine and is pivotally connected at 134 to the sliding lock bolt 135. Upon the release of the foot of lever 132 its head will be caused to oscillate toward the feed slide by the contraction of tension spring 136, thus throwing the locking bolt 135 along its guides 137 into contact with the adjustable slot 75 in the feed slide 63, as shown in dotted lines in Fig. XIX, momentarily locking that member against forward movement until the slot 65 in cam drum 64, Fig. II, has run past its high point and started a retrograde movement of the feed slide. The electrical contact will be broken at this point and as soon as the cam slot 65 has passed its high point and the withdrawing tendency of the feed slide started, the locking bolt 135 will be withdrawn from the slot 75 in the feed slide 63 by the mechanical resetting of the stop gear by the cam 138 on cam shaft 48 acting on the portion 139 of the bell crank lever, Fig. XIX. It will be noted that during the momentary locking of the feed slide 63 that the cam drum 64 is revolving independently and any slight linear movement of that end of the divided rack 66 directly operated by the cam drum will be absorbed by the spring 67 until the releasing of the slide and the beginning of its back run. This locking of the feed slide insures that all the blanks operated upon will be of uniform length.

In view of the foregoing description, the operation of this machine will be described very broadly. The blanks to be operated upon are distributed in the threads of the feeding screws and are progressively advanced centrally of the machine by the revolution of the screws in one direction, as previously explained, until they are picked up from the ends of the threads by the elevator mechanism, herein before described, and are held up endwise centrally of the feeding aperture in the head of the machine. At this point the feeding slide advances, grasping the blank in the jaws in the head of the feed spindle and thrusting it forward through the aperture in the face plate of the head and into position to be operated upon by the forming dies.

The progressive stages and movements through which the blank passes while being operated upon will be briefly described as follows: Fig. XXI shows the blank A in the form in which it will be supplied to the machine, gripped at one end by the jaws 80 introduced between the breaking down dies 33 until its end enters the end of the centering bushing 35. This will center the work, and at this point breaking down dies 33 will be caused to operate on the blank A by an oscillation of the cam wedge ring forcing in the thrust pins 47 and thereby advancing wedges 39. As the spindles rotate the anvils 37 simultaneously contact with the projecting rollers 6, transmitting the hammering action to the dies 33 which causes a reduction and consequent lengthening of the blank A. The work is then fed backwardly for a time as shown in Fig. XXII until the portion engaging the dies 33 in Fig. XXI is reduced and lengthened as shown in Fig. XXII. Then the work moves forward again in the opposite direction as indicated by arrows in Fig. XXIII until it reaches its original position as shown in Fig. XXI. This completes the work of the breaking down dies and at this time the wedge cam ring oscillates to release the wedges, and the heads of the die and wedge spindles are then given a relative one-quarter turn by the action of the oscillating spool cam 26, bringing the slots 31 of the die spindle holding the finishing dies 32 into alinement with the wedge slots 36 in the head of the wedge spindle 13. The wedge cam ring 52 now operates to again force in the wedges on these two finishing dies. Then the work is drawn back again to the right until it reaches the position shown in Fig. XXIV and finally is drawn forward to the left until it is pushed completely between the dies. Fig. XXV shows the last operation practically completed. At the completion of this operation, the forward end of the work; that is, in the present case a temple, engages head 19 of the oscillating rod 18 closing the electrical contact which immediately stops the feed motion as previously described and at this point the mechanism of the feed slide is reversed and the work withdrawn rearwardly, the oscillating wedge cam ring 52 operating to withdraw the wedges in order that the dies may then recede radially from the center to provide clearance for the enlarged end of the work to be withdrawn between them. The work after being withdrawn clear of the head of the machine is released by the automatic opening of the jaws of the feed spindle. After the completion of the final operation the finishing dies 32 are rendered inoperative by the oscillation of the spool cam 26, which at that time rotates the breaking down dies 33 into position of alinement with the wedge slots in preparation for the first operation to be performed on the next blank to be advanced.

In view of the foregoing it will be seen that this machine is entirely automatic in its every step in the production of a finished article from a stock of suitable form, and that the blank after being grasped by the feeding jaws will not be released until the entire operation has been completed.

Having now described my invention, what I claim as new and desire to secure by Letters Patent is:

1. In a machine of the character described, the combination of a head containing a set of reducing dies and a set of finishing dies, means to transmit hammering motion to the dies, a stock supply, means to throw the reducing dies out of action and the finishing dies into action on the stock and means to automatically position the stock and feed it back and forth during the operation of both sets of dies.

2. In a machine of the character described, the combination of a head containing a plurality of opposed sets of dies, each set of dies being of different shape, means for transmitting hammering motion to the dies, means for engaging one set of dies and releasing the others, mechanism adapted to bring the stock in alinement with the dies, and mechanism to feed the stock through the dies.

3. In a machine of the character described, the combination of a head having a plurality of opposed sets of dies, each set of dies being of different shape, means adapted to transmit hammering motion to the dies, a stock supply, mechanism adapted to feed the stock to the dies, and means adapted to throw one set of dies out of action and another set of dies into action to produce different formations in the stock at determined positions.

4. In a machine of the character described in combination with a rotary die head, a stock supply, a pair of breaking down dies and a pair of finishing dies in the die head, means for transmitting hammering motion to the dies, means for radially shifting the breaking down dies in position to engage the stock, means for thereafter withdrawing the breaking down dies and radially shifting the finishing dies to engage the stock, means for first moving the stock toward and then from the die head while the breaking down dies are operating, and means for thereafter withdrawing the stock and then moving it toward the die head while the finishing dies are operating upon it.

5. In a machine of the character described, the combination of a plurality of opposed sets of dies, each set of dies being different, means for transmitting hammering motion to the dies, means for engaging one set of dies and releasing the others, a stock supply, means for feeding the stock back and forth in the dies, means operated by the stock adapted to positively lock the feed against further advance, and means adapted to allow the feeding mechanism to advance without advancing the feed after it has been locked until said feeding mechanism has been reversed.

6. In a machine of the character described, in combination with a fixed and a rotary head, a plurality of opposed sets of dies, each set of dies being of different form, means to operate the dies, a stock supply, anvils alined with the dies, wedges between the anvils and dies, means for bringing the stock in alinement with the dies, means to grasp and feed the stock to the dies, means to tighten the wedges between the anvils and dies, means to release the wedges when the stock has been advanced to a predetermined point, means to engage another set of dies, and means to reverse the feed and withdraw the stock when it has reached a predetermined length.

7. In a machine of the character described, the combination of an anvil head and spindle, a die head and spindle, opposed sets of dies in the die head, each set of dies being of different form, anvils on the anvil head, wedges between the anvils and dies, a slidable ring connected with the dies, automatic means to advance the ring to tighten the wedges between the anvils and dies, means to release the wedges when the ring advancing means are inoperative, and automatic means to rotate the die head relatively to the anvil head when the wedges have been released to aline other dies with the anvils.

8. In a machine of the character described, the combination of a die head, having a plurality of sets of opposed dies, an anvil head revoluble axially therewith, and automatic means to rotate the die head relatively to the anvil head to bring the different sets of dies in alinement with the anvils.

9. In a machine of the character described, the combination of a die head, an anvil head revoluble axially therewith, automatic means adapted to give the die head a partial revolution relative to the anvil head, roller hammers, means between the dies and anvils for transmitting the hammer blows to the dies and automatic means for releasing the transmitting means in one set of dies and replacing it as a second set of dies is brought into alinement with the anvils.

10. In a machine of the character described, the combination of a rotary head having a plurality of die ways, dies in the die ways, a second head revoluble on the same axis as the first head, anvils on the second head adjacent the die ways of the first, roller hammers adapted to engage the anvils and automatic means for releasing one set of dies and bringing the second set in alinement with the anvils.

11. In a machine of the character described, the combination of a spindle having a head provided with a plurality of opposed dies, each set of dies being of different form, a spindle and head concentric therewith having anvils alined with the dies, a cam spool concentric with the anvil spindle and mounted on the die spindle, a power shaft separate from the die and anvil spindles, oscillating means on the power shaft adapted to reciprocate the spool on the die spindle, and means operated by the spool adapted to rotate the die spindle relatively to the anvil spindle to bring a new set of dies in line with the anvils.

12. In a machine of the character described, the combination of a spindle having a head provided with a plurality of opposed dies, each set of dies being of different form, a spindle concentric therewith having a head with anvils alined with the dies, a spool cam concentric with the die and anvil spindles, a power shaft separate from the die and anvil spindles, means on the power shaft to reciprocate the spool cam, and means operated by the spool cam to rotate the die spindle relatively to the anvil spindle to bring another set of dies in line with the anvils.

13. In a machine of the character described, the combination of a fixed head, a rotary head concentric therewith having a plurality of opposed sets of dies, each set of dies being different in form, means for transmitting hammering motion to the dies as the die head is rotated in the fixed head, and automatic means for releasing the transmitting means in one set of dies and engaging those in a second set of dies.

14. In a machine of the character described, the combination of a fixed head, a rotary head concentric therewith having a plurality of opposed sets of dies, each set of dies being different in form, means for transmitting hammering motion to the dies as the die head is rotated in the fixed head, wedges between the dies and the transmitting means, and automatic means for withdrawing the wedges from one set of dies and inserting them in another set of dies.

15. In a machine of the character described, the combination of an anvil head, a die head, opposed sets of dies in the die head, each set of dies being of different form, anvils in the anvil head in alinement with the dies, wedges between the anvils and dies, and automatic means to tighten and release the wedges and give the die head a relative rotation to the anvil head when the wedges are released to engage a different set of dies.

16. In a machine of the character described, the combination of a die head having a plurality of opposed dies, anvils alined with the dies, means adapted to transmit hammering motion to the dies through the anvils, a grooved ring slidable in the die head, wedges between the anvils and dies adapted to engage the grooved ring, and automatic means to reciprocate the grooved ring to move the wedges back and forth between the anvils and dies.

17. In a machine of the character described, the combination of a die head having a plurality of opposed dies, anvils alined with the dies, means adapted to transmit hammering motion to the dies through the anvils, a power shaft separate from the die head, a cam on the power shaft, a cam on the die head, means for transmitting oscillatory motion from the power shaft cam to the die head cam, a grooved ring slidable in the die head, means engaging the die head cam to slide the grooved ring and wedges engaging the grooved ring and adapted to move back and forth between the anvils and dies as the grooved ring is operated.

18. In a machine of the character described, in combination with a fixed and a rotary head, a plurality of opposed sets of dies, each set of dies being of different form, means to operate the dies, a stock supply, anvils alined with the dies, wedges between the anvils and dies, means to grasp and feed the stock to the dies, means to tighten the wedges between the anvils and dies, means to release the wedges when the stock has been advanced to a predetermined point, and means to engage another set of dies.

19. In a machine of the character described, the combination of a die head having a plurality of opposed sets of dies, each set of dies being different in form, anvils alined with the dies, means for transmitting hammering motion to the anvils and dies, force transmitting means between the anvils and dies, and automatic means for releasing the force transmitting means in one set of dies and throwing another set of dies into engagement therewith.

20. In a machine of the character described, the combination of operating dies, means to operate the dies, a stock supply, a slide adapted to feed the stock to the dies, a stop for the slide, means adapted to operate the stop and lock the slide and electric means adapted to actuate the stop operating means.

21. In a machine of the character described, the combination of a fixed head, a centrally bored die head rotatable within the fixed head, dies in the die head, means to operate the dies, a stock supply, an electric circuit, a plunger in the die head, an electric contact in alinement with the plunger, a slide adapted to grasp the stock and feed it within the bore of the die head, a stop for the slide, and means adapted to throw the stop into engagement with the slide when the circuit is closed by the plunger as it is pushed back by the stock.

22. In a machine of the character described, in combination with operating dies, means to actuate the dies, a plunger, a feed slide, an electric circuit, means on the slide to cause the plunger to close the circuit, a stop for the slide, means adapted to throw the stop into engagement with the slide when the circuit is closed, mechanism to break the circuit, and means to withdraw the stop when the circuit is broken.

23. In a machine of the character described, in combination with operating dies, means to operate the dies, a stock supply, a slide adapted to feed the stock to the dies, a stop for the slide, an electric circuit, means to close the circuit and mechanism adapted to throw the stop into engagement with the slide when the circuit has been closed, means to break the circuit, and operable means to withdraw the stop when the circuit has been broken.

24. In a machine of the character described, the combination of a plurality of reciprocating dies, means to reciprocate the dies, a stock supply, mechanism adapted to feed the stock to the dies and mechanism operated by the stock adapted to positively lock the feed against further advance when the stock has reached a predetermined length.

25. In a machine of the character described, the combination of a plurality of reciprocating dies, means to reciprocate the dies, a stock supply, mechanism adapted to feed the stock to the dies, an electric circuit, means for closing the circuit, and means operated by the electric circuit adapted to positively lock the feed against further advance when the electric circuit has been closed.

26. In a machine of the character described, the combination of operating dies, means to operate the dies, a stock supply, a slide adapted to feed the stock to the dies, a stop for the slide, means adapted to operate the stop and positively lock the slide, and means to withdraw the stop and release the slide.

27. In a machine of the character described, the combination of a die head having a plurality of opposed sets of dies, means to transmit hammering motion to the dies, a contact arm, an electric circuit, a magazine adapted to supply blanks, a feed slide adapted to grasp a blank, a stop for the slide, electric means to operate the stop, means to operate the feed whereby the blank, when it has reached a predetermined length, will engage the contact arm and close the electric circuit whereby the electric means will be energized and throw the stop into engagement with the feed slide.

28. In a machine of the character described, the combination of a feed slide having a recess, a pin adapted to slide in and out of the recess, yielding means adapted normally to hold the pin in the recess, a trip lever adapted to operate the pin, means to lock the trip lever and hold the pin in withdrawn position against the pressure of the yielding means, electro magnetic means to release the trip and mechanical means to reset the trip.

29. In a machine of the character described, the combination of a feed slide, a power shaft independent of the slide, a reciprocating cam drive on the shaft, a reciprocating rack engaging the cam, a rack on the feed and intermeshing gearing operatively connecting the two racks.

30. In a machine of the character described, the combination of a head having a plurality of operating dies, means to operate the dies, a stock supply, means to feed the stock back and forth between the dies, and means operated by the stock itself to reverse the feed when the stock has reached a predetermined length.

31. In a machine of the character described, the combination of a feed slide, means for reciprocating the slide, and resilient means adapted to absorb the strain on the reciprocating mechanism between the time the slide has reached its inward limit and the time it starts to reverse.

32. In a machine of the character described, the combination of a feed slide, a reciprocating cam drive for the feed and resilient means between the cam drive and the slide adapted to absorb the strain on the drive cam between the time the slide has reached its inward movement and the time the cam starts to reverse the motion of the slide.

33. In a machine of the character described, the combination of a head having a plurality of reciprocable dies, means to reciprocate the dies, a stock supply, mechanism adapted to feed the stock back and forth between the dies, mechanism adapted to positively stop the feed when the stock reaches a predetermined length and resilient means adapted to absorb the strain on the feeding mechanism between the time the feed has reached its inward limit and the time the feed starts to reverse.

34. In a machine of the character described, the combination of a jaw slide, gripping jaws pivoted thereon, means to open and close the jaws, a support within the jaws and means on the support adapted to project centrally between the jaws and abut the object to be gripped.

35. In a machine of the character described, the combination of a pair of jaws, an operating rod protruding between the jaws, a plunger abutting the operating rod, a cam engaging the plunger, a trip lever on the cam and stops adapted to engage the trip at predetermined points.

36. In a machine of the character described, the combination of a feed slide, a power shaft, substantially parallel with the feed slide, jaws on the feed slide, jaw operating means, a trip lever having a contact head, yielding means adapted normally to hold the contact head out of alinement with the jaw operating means and a cam on the power shaft adapted to trip the lever at determined intervals and throw the contact head into alinement with the jaw operating means.

37. In a machine of the character described, the combination of a feed slide, a jaw clutch fulcrumed on the slide, an operating rod having a tapered head protruding between the levers of the clutch, yielding means adapted to hold the clutch levers in contact with the tapered head of the operating rod, means to actuate the rod and spaced stops adapted to engage the actuating means to advance and release the rod.

38. In a machine of the character described, the combination of a feed slide, a jaw slide in reciprocal relation thereto, resilient means tending normally to retain the feed and jaw slide in fixed relation to each other, means adapted to allow a slight lateral displacement of the jaw slide under pressure, and a stop adapted to regulate the amount of such displacement.

39. In a machine of the character described, the combination of a centrally bored die head, a stock holder adapted to hold the stock, mechanism adapted to bring a portion of the stock on its holder in alinement with the bore of the die head, means for grasping the stock and advancing it into the bore of the die head and means adapted to advance a second portion of stock in alinement with the bore of the die head when the first portion has been withdrawn.

40. In a machine of the character described, the combination of a centrally bored die head, threaded means adapted to successively hold a series of stock blanks, positioning means adapted to receive a single stock blank, operative means adapted to throw the positioning means into alinement with the bore of the die head, means adapted to grasp the positioned blank and advance it into the die head, means to return the positioning means to initial position, and means on the grasping means to advance the threaded means sufficient to place a second stock blank on the positioning means as the first blank is withdrawn from the die head.

41. In a machine of the character described, the combination of a centrally bored die head, screws transverse to the bore of the die head adapted to carry a series of stock blanks, guides on the screws, a lever adapted to grasp the innermost blank, a power shaft independent of the die spindle, means on the power shaft to trip the lever and throw the innermost blank in alinement with the bore of the die spindle, means to return the lever to initial position, jaws adapted to grasp the positioned blank and advance it into the die spindle, ratchet gears on the screws, and a rack on the jaws adapted to engage the screw gears and advance a second blank as the first blank is withdrawn from the die head.

42. In a machine of the character described, the combination of a centrally bored die head having a plurality of reciprocal dies, a guide support within the bore of the head, centering jaws having a guide section in alinement with the guide support pivoted on the head, and yielding means tending to draw the jaws together.

In testimony whereof I affix my signature in presence of two witnesses.

GEORGE H. DAY.

Witnesses:
 CHARLES I. KING,
 REGINALD H. WATERS.